US005791037A

United States Patent [19]

Takada et al.

[11] Patent Number: 5,791,037

[45] Date of Patent: Aug. 11, 1998

[54] APPARATUS AND METHOD FOR WIRE CRIMPING

[75] Inventors: Kazuhiko Takada; Sanae Kato, both of Gotenba, Japan

[73] Assignee: Yazaki Corporation, Tokyo, Japan

[21] Appl. No.: 782,268

[22] Filed: Jan. 15, 1997

Related U.S. Application Data

[62] Division of Ser. No. 354,712, Dec. 6, 1994, Pat. No. 5,611,141.

[30] Foreign Application Priority Data

| | | | |
|---|---|---|---|
| Jul. 12, 1993 | [JP] | Japan | 5-306472 |
| Jul. 12, 1993 | [JP] | Japan | 5-306473 |
| Aug. 12, 1993 | [JP] | Japan | 5-307857 |
| Aug. 12, 1993 | [JP] | Japan | 5-307858 |

[51] Int. Cl.[6] .............. B23P 19/00; H01R 43/00

[52] U.S. Cl. .............. 29/566.3; 29/748

[58] Field of Search .............. 29/566.1, 566.3, 29/33 M, 753, 754, 748, 749, 564.4, 564.6

[56] References Cited

U.S. PATENT DOCUMENTS

| | | | |
|---|---|---|---|
| 4,114,014 | 9/1978 | Shogo et al. | 29/564.4 X |
| 4,370,806 | 2/1983 | Funick et al. | 29/749 |
| 4,373,261 | 2/1983 | Long, Jr. | 29/749 X |
| 4,493,147 | 1/1985 | Bakermans | 29/861 |
| 4,551,893 | 11/1985 | Ikeda et al. | 29/33 M |
| 4,638,549 | 1/1987 | Okazaki et al. | 29/564.4 |
| 4,734,965 | 4/1988 | Schaefer | 29/33 M |
| 4,970,777 | 11/1990 | Folk et al. | 29/748 |
| 4,976,294 | 12/1990 | Kudo et al. | 29/564.6 |
| 5,033,186 | 7/1991 | Gaskell | 29/749 |
| 5,471,741 | 12/1995 | Heisner | 29/861 X |

FOREIGN PATENT DOCUMENTS

| | | | |
|---|---|---|---|
| 37202 | 10/1981 | European Pat. Off. | 29/749 |
| 58-145080 | 8/1983 | Japan . | |
| 60-14780 | 1/1985 | Japan . | |
| 61-109286 | 5/1986 | Japan . | |

*Primary Examiner*—William R. Briggs
*Attorney, Agent, or Firm*—Nikaido, Marmelstein, Murray & Oram LLP

[57] ABSTRACT

A wire crimping apparatus includes a pair of wire-length setting rollers, a pair of crimping cylinders arranged in a direction of feeding a wire, a pair of wire guides which are openably/closably attached between said pair of crimping cylinders, a pair of moving tables which has connector container grooves opposite to said pair of crimping blades and can move independently of a direction horizontally orthogonal to a wire, and a wire guide stand which has a wire pushing-down cylinder and can move in the direction vertically orthogonal to the wire. On a pair of moving tables, each wire is crimped to the connector on a first moving table at a forward position in the direction of wire feeding, is extended to have a required length between the moving tables by the wire-length setting roller, crimped to the connector on a second moving table at a backward position in the direction of wire feeding, and the moving tables are moved in opposite directions to connect wires between the connectors in a crossing manner.

1 Claim, 15 Drawing Sheets

APPARATUS AND METHOD FOR WIRE CRIMPING

This is a division of application Ser. No. 08/354,712 filed Dec. 6, 1994, now U.S. Pat. No. 5,611,141.

BACKGROUND OF THE INVENTION

1. Field of the Invention

The present invention relates to an apparatus and method for wire crimping, and more particularly to a portable apparatus and method for wire crimping which can connect wires between a pair of connectors in a crossing manner and a single connector with a plurality of connectors through different lengths of wires.

2. Description of the Prior Art

FIG. 19 shows the prior art wire crimping apparatus disclosed in Japanese Preliminary Publication No. Sho 60-14780.

A wire crimping apparatus 70 includes a guide 72 for passing through plural parallel electric wires (hereinafter simply referred to as 'wire') 71, a chuck 73 for grasping the front ends of the wires 71, a transport chain 74 which can move the chuck back and forth, a cutter 75 for cutting the plural wires 71, a crimping punch 77 and a crimping die 78 for simultaneously crimping the plural wires 71 to a crimping terminal in a connector 76, and a holding cylinder 79 for fixing the rear sides of the plural wires 71.

The front ends of the wires 71 cut by the cutter 75 are crimped to a first connector $76_1$ by the crimping punch 77 and die 78. Subsequently, the connector $76_1$ is moved forward by driving of the transport chain 74, a second connector $76_2$ is connected to the intermediate portions of the wires as shown in FIG. 20, and a third connector $76_3$ is connected to the wires after the transport 74 has further moved forward. Thereafter, the transport 74 is moved forward to cut the wires 71 at the read end of the third connector $76_3$.

However, the wire crimping apparatus has the following drawbacks.

1. In the prior art wire crimping apparatus 70, as shown in FIG. 19, plural connectors 76 can be connected in series in a longitudinal direction of the wires 71. But, the plural connectors 76 cannot be connected in parallel in a direction of aligning the wires in parallel, the wires 71 with different lengths cannot be connected to the respective connectors 76, and the wires 71 cannot be connected in a crossing manner.

2. In the prior art wire crimping apparatus 70, because the moving distance of the transport chain 74 for varying the length of each wire between the connectors, the length of the wire to be set was limited. Setting the length of the wire by the transport chain 74 could not be performed with high accuracy because of a play of the chain 39 which moves back and forth.

3. In the prior art wire crimping apparatus 70, the transport chain 74 could not extend the wires smoothly.

FIG. 21 shows the state of wire crimping in another prior art wire crimping apparatus. In the wire crimping apparatus, simultaneously when the wires 71 pressed down by a crimping blade 86 are a block blade 87, they are crimped to the crimping terminals of a connector 88. But, when the wires 85 are pulled back as indicated by an arrow a because of their own weight, a protruding margin S of the wires for the crimping terminals 89 is decreased, thus attenuating the reliability of electric connection.

4. In the prior art wire crimping apparatus 70 as shown in FIG. 19, in moving the connector 76 by the transport chain 74, the transport chain 74 must be moved back and forth and the wires must be grasped again. This makes it difficult to move the connector smoothly and swiftly.

SUMMARY OF THE INVENTION

A first object of the present invention is to provide a wire crimping apparatus and method which can connect wires in a crossing manner between a pair of connectors, and connect a single connector to plural connectors through wires having different lengths.

A second object of the present invention is to provide a wire length setting device in a wire crimping apparatus which can set the wire length freely and accurately in crimping wires to connectors.

A third object of the present invention is to provide a wire pushing-down mechanism in a wire crimping apparatus which can smoothly extend the wires to a desired length between connectors and permits the wires to be surely crimped to the connectors.

A fourth object of the present invention is to provide a connector moving mechanism in a wire crimping apparatus which can move a connector smoothly and quickly so as to perform wire crimping effectively.

In accordance with the present invention, there is provided a wire crimping apparatus comprising: wire-length setting means for letting out a wire having a predetermined length; a pair of wire crimping means for crimping the wire to connectors, said crimping means being arranged in parallel in a direction of feeding the wire; wire guiding means for guiding the wire between said pair of wire crimping means, said guiding means being arranged between said wire crimping means; and a pair of connector moving means for moving the connectors independently of each other in a direction orthogonal to the wire, said connector moving means being located at said pair of wire crimping means.

In the wire crimping apparatus according to the present invention, each wire let out by the wire-length setting device is arranged in opposition to the wire crimping blades of a pair of crimping cylinders through between wire guides. The wire is first crimped on the side of a forward wire crimping blade in the direction of wire feeding, is subsequently extended to a required length by the wire-length setting rollers, while the wire guides and finally crimped on the side of a backward crimping blade. In this case, a pair of connector moving tables are moved independently of each other in the direction horizontally orthogonal to the wire, thus connecting the wire to the connectors in a crossing manner. Thus, wires can be connected between a pair of connectors, a single connector can be connected to plural connectors by wires with different lengths. Thus, a great variety of directions of arranging wires and connector connection formats can be realized.

The above and other objects and features of the present invention will be more apparent from the following description taken in conjunction with the accompanying drawings.

DESCRIPTION OF THE PREFERRED EMBODIMENTS

Figure 1:
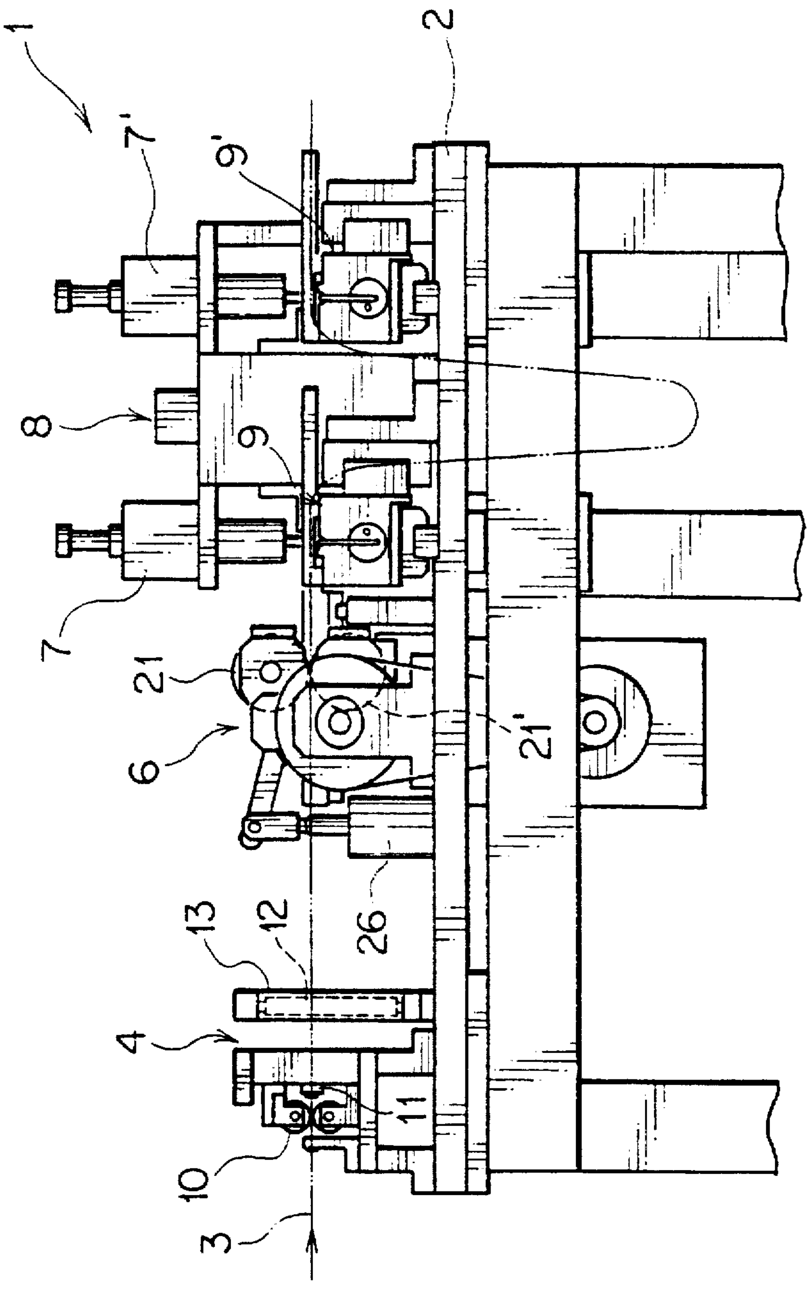
FIG. 1 is a side view of one embodiment of the wire crimping apparatus according to the present invention.
Figure 2:
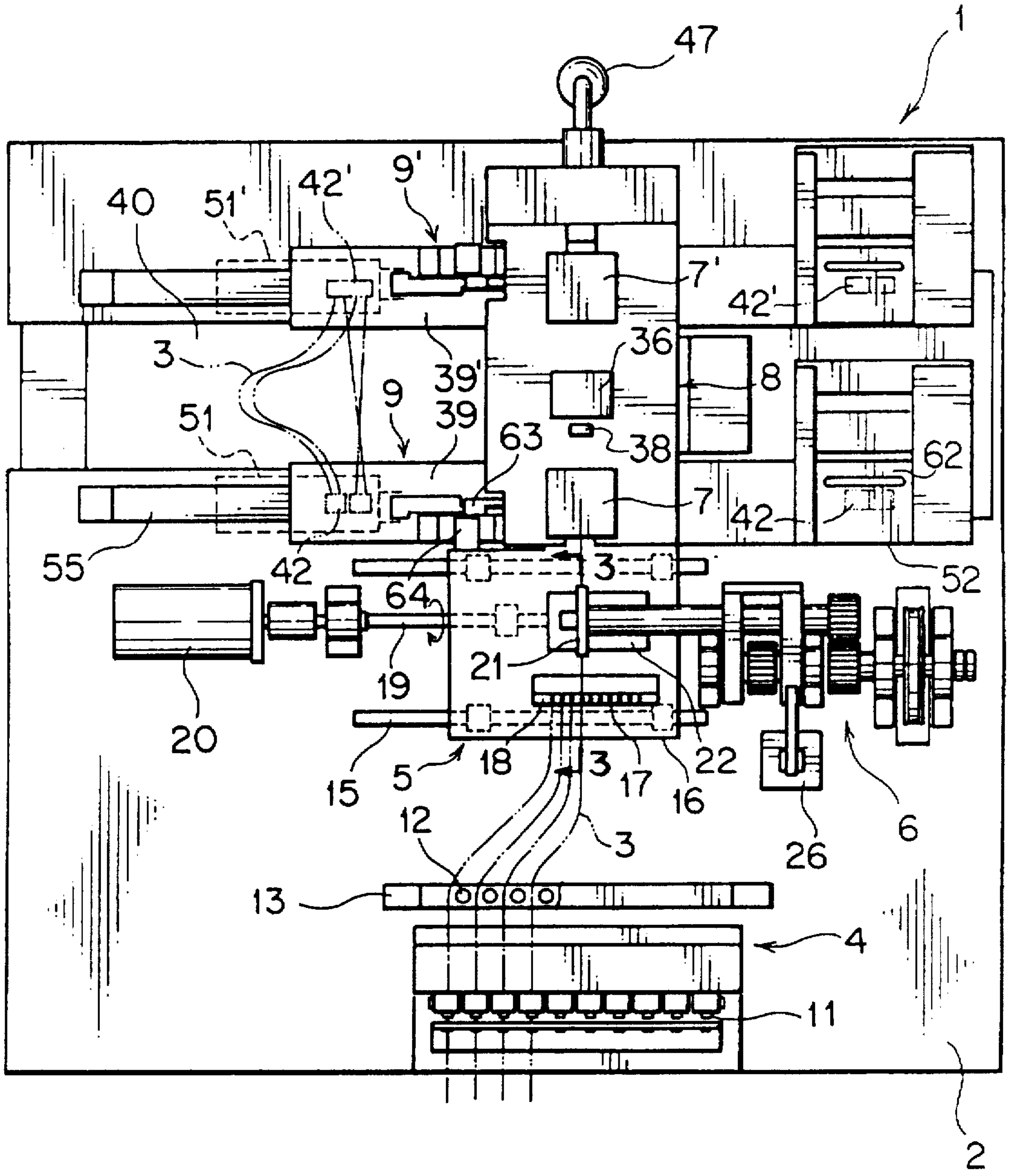
FIG. 2 is a plan view of the wire crimping apparatus of FIG. 1.

FIG. 1 is a side view of one embodiment of a wire crimping apparatus 1 according to the present invention. FIG. 2 is a plan view of the wire crimping apparatus according to the present invention.

The wire crimping apparatus 1 includes a wire introducing portion 4, a wire selecting portion 5 (FIG. 2), a wire-length setting portion 6, a wire crimping section having a pair of wire crimping cylinders 7, 7' and a pair of connector transverse moving sections 9, 9' opposite to the wire crimping cylinders 7, 7', which are mounted on a movable table 2 equipped with a caster.

The wire introducing section 4 includes a wire supporting roller 10 spring-forced toward a wire sandwiching direction, plural wire introducing nozzles 11 arranged in parallel and grid-like guide frame 13 having plural pillar guide rollers 12.

Figure 3:
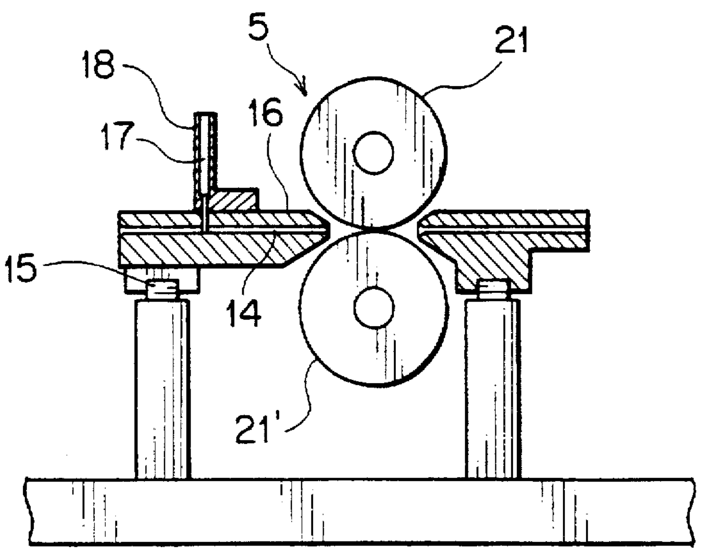
FIG. 3 is a sectional view of a wire guide stand taken along line A—A of FIG. 2.

The wire selecting section 5, as shown in FIG. 3, is includes a wire guide stand 16 which has a wire through-hole 14 in a back-and-forth direction (X-direction) and is movable in a transverse direction in which the wires are arranged (Y-direction) along a rail 15, a cylinder container wall 18 which is vertically provided at the front end of the wire guide stand 16 and incorporates, in parallel, plural vertical air type minute pressing cylinders 17 for the plural wires 3, and a motor 20 for driving the screw shaft 19 (FIG. 2).

In the center of the wire guide stand 16, an approaching window 22 for a pair of upper and lower wire-length setting rollers 21, 21' of the wire-length setting section 6 is provided. A selected single wire 3 is passed through the wire guiding hole 14 of the wire guiding stand 16, and the remaining wires are fixed by the pressing cylinder 17. The selected wire 3 is positioned between the upper and lower wire-length setting rollers 21 and 21' by transverse shift of the wire guiding stand 16 by the driving motor 20.

The length of the wire 3 is linearly set by the wire-length setting rollers 21, 21' and is sent to the wire crimping section 8. The detail of the wire-length setting section 6 will be explained later.

Figure 4:
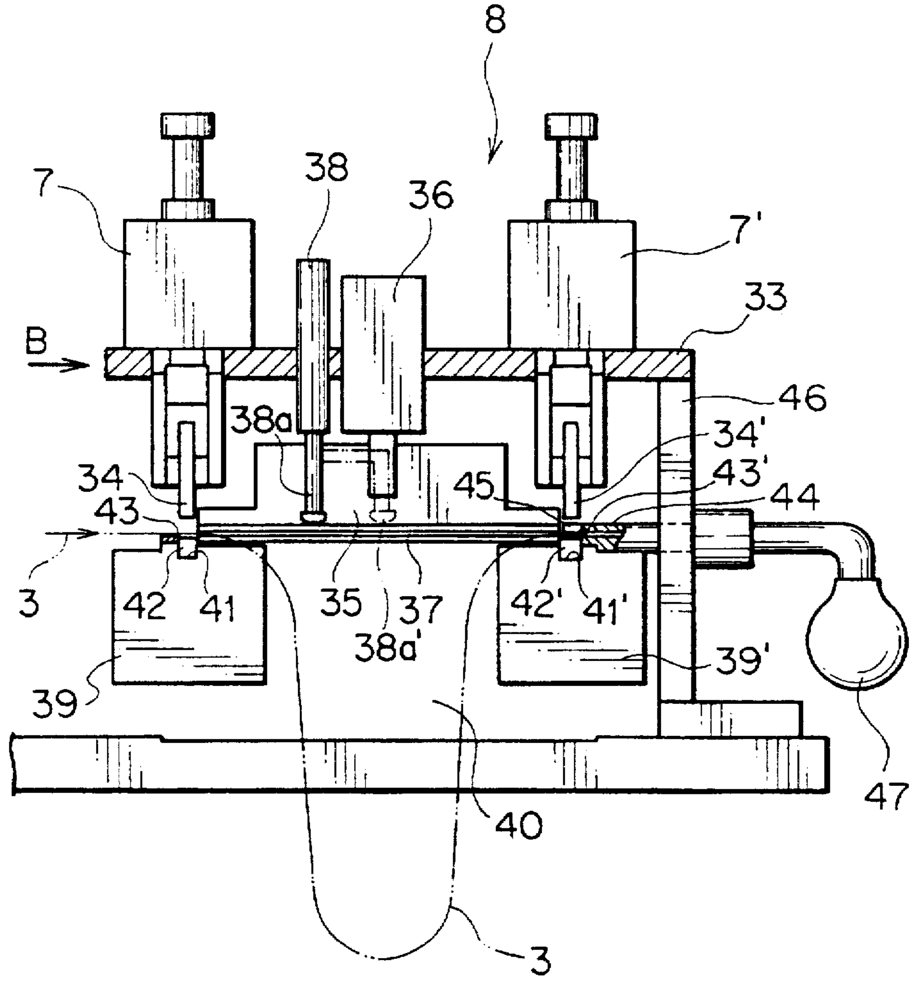
FIG. 4 is a side view of a wire crimping section.
Figure 5:
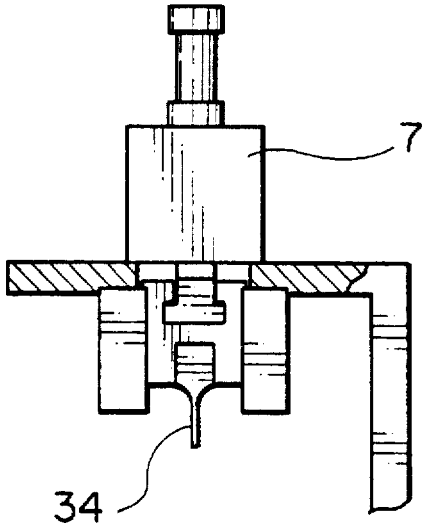
FIG. 5 is a front view of a crimping cylinder viewed from arrow B in FIG. 4.
Figure 6:
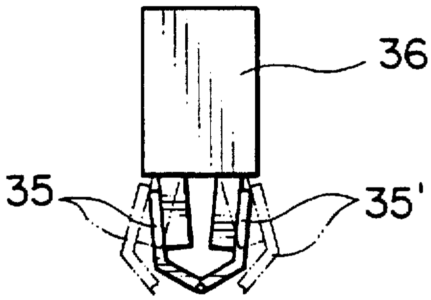
FIG. 6 is a front view of a chuck cylinder viewed from arrow B in FIG. 4.

The wire crimping section 8, as shown in FIGS. 4 to 6, includes a pair of vertical air-type crimping cylinders 7, 7' which are arranged on a fixing stand plate 33 and have a pair of crimping blades 34, 34' fixed at their ends of their rods, and a chuck cylinder 36 having a pair of closable wire guides 35, 35' located between the pair of crimping blades 34, 34'.

The pair of wire guides 35, 35' have a semi-circular or square (in section) wire passing-through groove 37, and the front and rear ends of the wire guides 35, 35' are in proximity to the crimping blades 34, 34'. A vertical air-type wire pushing-down cylinder 38 is installed, in proximity to the chuck cylinder 36, on the fixing stand 33. The rod **38*a* of the wire pushing-down cylinder 38 advances between the opened pair of wire guides 35, and presses down, in a U-shape, the wire 3 further let out by the wire-length setting rollers 21, 21'. Incidentally, in place of the chuck cylinder 36, a cylinder placed sideways (not shown) may be used to open or close the wire guides 35, 35' so that the wire pushing down cylinder 38 is located on the position (center) of the chuck cylinder 36**.

As shown in FIG. 4, below the crimping cylinders 7, 7', moving tables 39, 39 of the connector moving sections 9, 9' are located in parallel spaced by a space portion 40 from each other. The connector container grooves 41, 41' of the moving tables 39, 39' are located in opposition to the crimping blades 34, 34', respectively. In each of the connector container grooves 41, 41', plural crimping connectors 42, 42' having the corresponding crimping terminals can be loaded in series. At the outer upper portions of the connector container grooves 41, 41', square block blades 43, 43' to be brought into contact with the crimping blades 34, 34' are arranged. The wire 3 is cut immediately by the block blades 43, 43' before it is crimped to the connectors 42, 42' within the container grooves 41, 41'.

The wire 3 is crimped to the connector 42' by the crimping cylinder 7' located at a forward position in a wire feeding direction. The wire, which is thereafter formed in a U-shape (second wire-length setting) by the wire length setting rollers 21, 21', is crimped to the connector 42 by the crimping cylinder 7 located at a backward position. The crimping blade 34' falls along the slit-like guide groove 45 of a trimming guide 44 provided above the moving table 39'. On a front frame wall 46 (FIG. 4), a vacuum-type cutting refuse container portion 47 is provided so as to communicate with the trim guide 44.

The pair of moving tables 39, 39' can move independently of each other in a transverse direction which is orthogonal to the wire. In this case, the cut terminal of the wire is pulled back (third wire-length setting) by reverse rotation of the wire length setting rollers 21, 21' so that interference with the moving table 39 can be prevented.

The details of the connector moving sections will be described later.

Figure 7A:
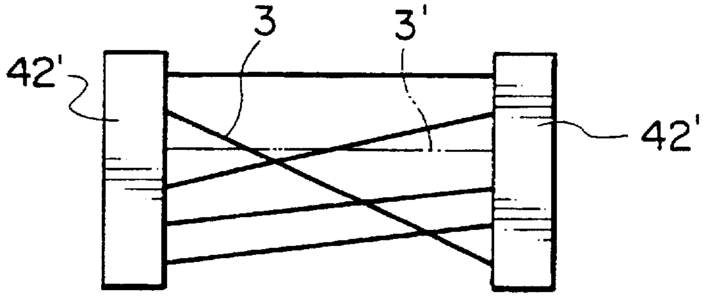
FIGS. 7A to 7D are plan views of several kinds of arrangements in which wires are connected to connectors.
Figure 7B:
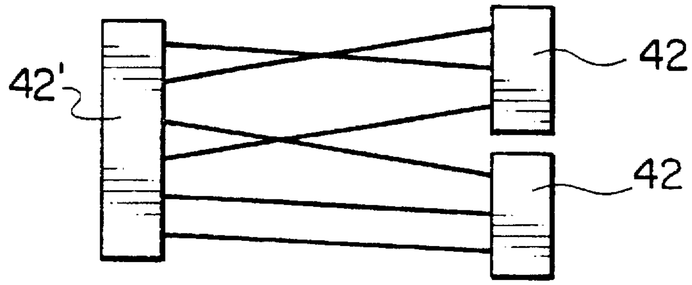
Figure 7C:
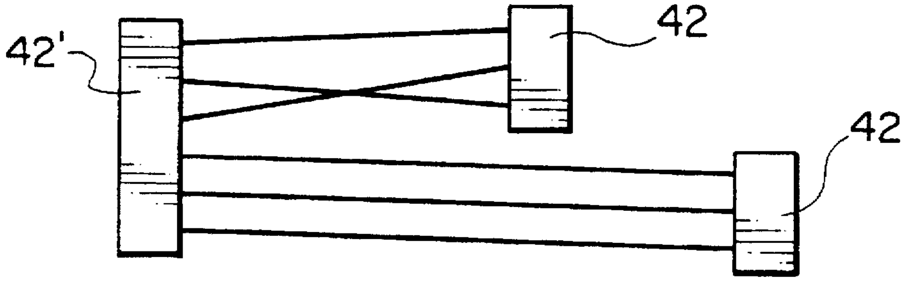
Figure 7D:
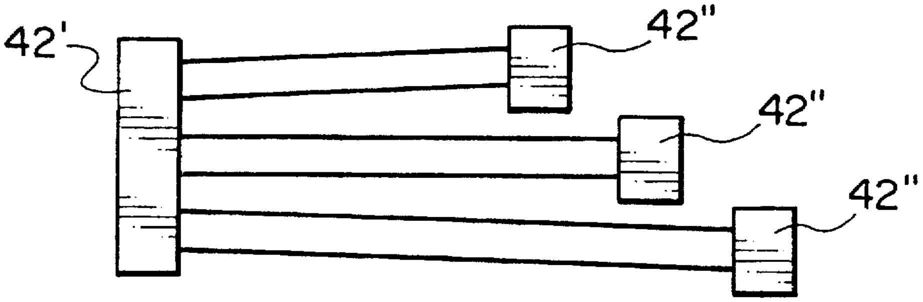

As described above, the pair of moving tables 39, 39' in parallel can move independently of each other by the corresponding moving motors 51, 51'. For this reason, several kinds of wire connection formats as shown in FIGS. 7A to 7D can be formed. In FIG. 7A, wires 3 are connected between a pair of the same connectors 42' and 42' in a crossing manner. Such a connecting format can be swiftly made by moving the pair of moving tables 39, 39' in opposite directions. It is also possible that an intermediate wire 3' is not connected. In FIG. 7B, two short connectors 42, 42 are connected to a long connector 42'. In FIG. 7C, wires with different lengths are connected to two connectors 42, 42 in such a manner that the length in the second wire-length setting by the wire-length setting rollers 21, 21' is varied. Further, in FIG. 7D, a single connector 42' is connected to plural connectors 42" through wires having different lengths in parallel.

Figure 8:
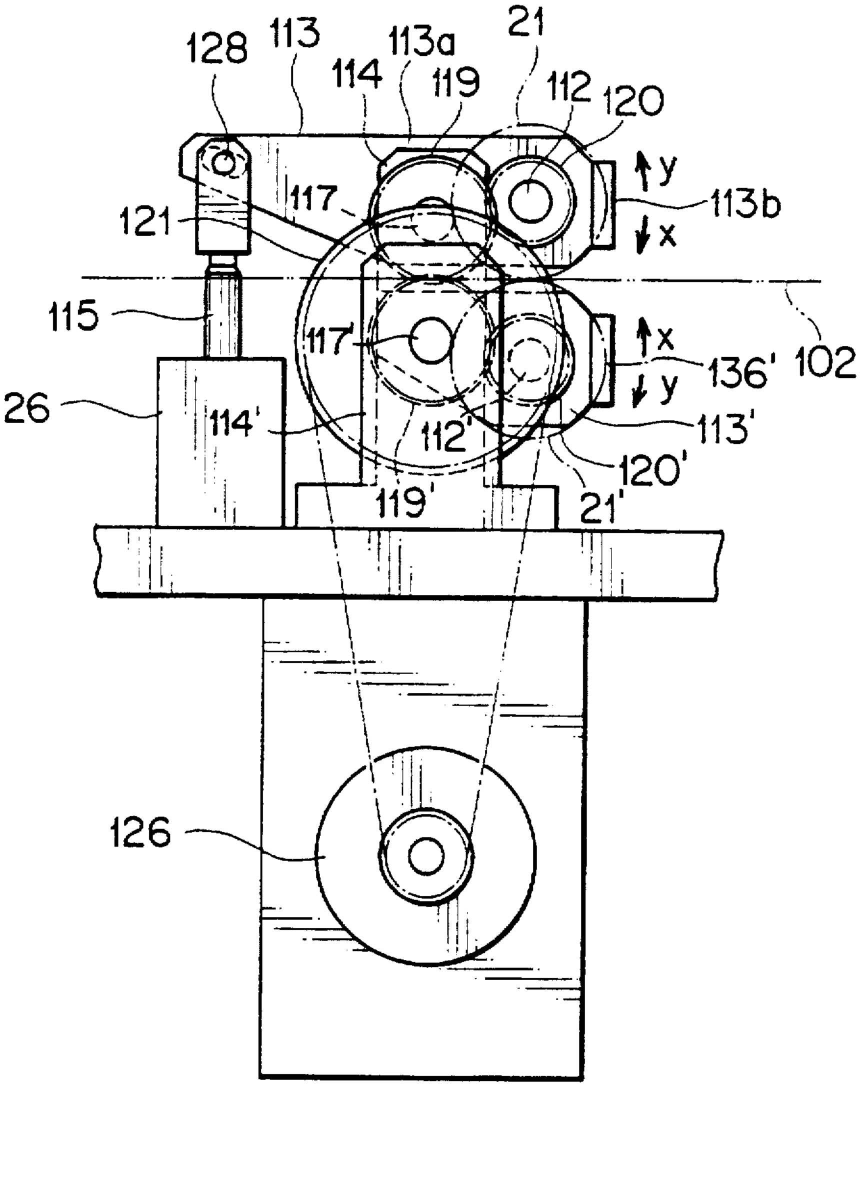
FIG. 8 is a side view of the wire-length setting device according to the present invention.
Figure 9:
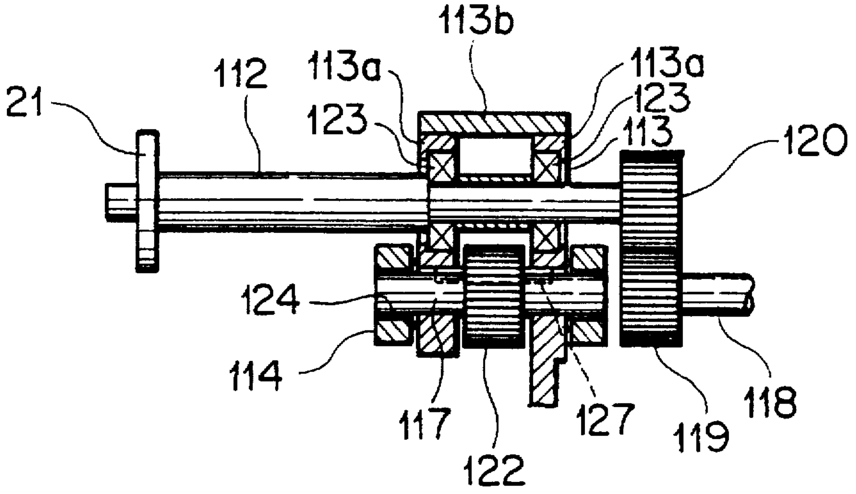
FIG. 9 is a plan view of an upper wire-length setting roller driving portion.
Figure 10:
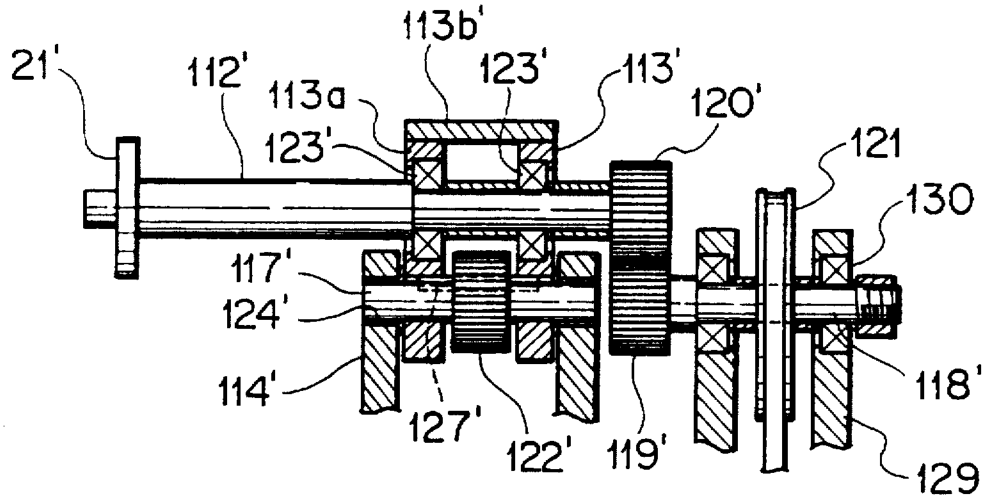
FIG. 10 is a plan view of a lower wire-length setting roller driving portion.

Now referring to FIGS. 8 to 10, an explanation will be given of the wire-length setting portion 6 shown in FIG. 1. FIG. 8 is a side view of the entire wire-length setting portion 6. FIG. 9 is a plan view of a portion of driving the upper wire-length setting portion 21'. FIG. 10 is a plan view of a portion of driving the lower wire-length setting roller 21. In FIGS. 8 to 10, like reference numerals refer to like elements in FIGS. 1 to 7.

As seen from FIGS. 8 to 10, the wire-length setting section 6 includes a pair of upper and lower wire-length setting rollers 21, 21', a pair of rotating axes 112, 112' to the respective tips of which the wire-length setting rollers 21, 21' are fixed, a pair of upper and lower swinging plates 113, 113' which are supported by the rotating axes 112, 112', a pair of frames which rotatably support the swinging plates 113, 113', a vertical air-type swinging cylinder 26 with the tip of a rod 115 coupled with the stem of the rectangular upper swinging plate 113, a pair of driving shafts 118, 118' located coaxially adjacent to the shafts 117, 117' of the swinging plates 113, 113', a pair of upper and lower toothed wheels 119, 119' meshed each other which are fixed to the pair of driving shafts 118, 118', a pair of follower toothed wheels 120, 120' fixed to the stems of the rotating axes 113, 113' of the upper and lower wire-length setting rollers 21, 21' and meshed with the driving toothed wheels 119, 119', a belt pulley 121 which serves as an input means fixed to the lower driving shaft 118', a motor 126 for driving the belt pulley 121, and swinging toothed wheels 122, 122', which serve as a swinging mechanism, fixed to the centers of the upper and lower shafts 117, 117' and meshed with each other.

The upper and lower swinging plates 113, 113' each has a pair of left and right side plates **113*a* and 113*a'* which are connected to form a ] shape by front coupling plates 113*b* and 113*b'*. The above rotation shafts 112 and 112' are supported by the pair of side plates 113*a*, 113*a'* by means of the pair of bearings 123, 123'. Behind the rotating shafts 112, 112', the supporting shafts 117, 117' of the swinging toothed wheels 122, 122' are supported by the flames 114, 114' though the bushings 124, 124'. The flames 114, 114' are fixed to the table 2 of the wire crimping apparatus 1. The swinging toothed wheels 122, 122' are arranged at intermediate positions of the swinging plates 113, 113'. The supporting shafts 117, 117' and the swinging gears 122, 122' are fixed through keys 127, 127'. The supporting shafts 117, 117' and the swinging plates 113, 113' are fixed by the keys 127, 127'**.

With the upper and lower swinging toothed wheels 122, 122' always meshed with each other, the supporting shafts 117, 117' serve as rotating fulcrums of the upper and lower swinging plates 113, 113'. The upper and lower swinging plates 113, 113' can swing simultaneously in opposite directions of arrows a and b by means of the swinging toothed wheels 122, 122' at the fulcrums of the supporting shafts 117, 117'.

The swinging plates 113, 113' are driven by the swinging cylinder 26. As shown in FIG. 8, the rod 115 of the swinging cylinder 26 is coupled with the stems of the side plates **113*a* of the upper swinging plate 113 which projects more behind than the lower swinging plate 113'. The swinging plates 113, 113' swing toward the coupling direction of the wire-length setting rollers 21, 21' by the extension operation of the swinging cylinder 26, whereas they swing toward the separation direction of the rollers 21, 21' by the contraction of the cylinder 26. The upper and lower wire-length setting rollers 21, 21' are always rotated by rotation of the upper and lower driving gears 119, 119', and send the wire 3 with the aid of the swinging cylinder 26** while they move in the roller coupling direction.

The driving shafts 118, 118' to which the driving gears 119, 119' are fixed are rotatably supported on the flame 129 of the table 2 though a pair of bearings 130. Now, since the upper and lower wire-length setting rollers 21, 21' are simultaneously driven, they can send out the wire 3 with an accurate length with no slip by uniform force. Further, since driving force is acted simultaneously on both upper and lower surfaces of the wire 3, unlike the prior art, sufficient driving force is transmitted to the wire 3 without strong contracting of the wire 3 by the upper and lower rollers, thus preventing the wire 3 from being crushed. The rollers can follow slight changes in the covering shape and outer diameter of the wire 3.

In accordance with the wire length setting device according to the present invention, a pair of length setting rollers are always rotated and swinging plates are driven in opposite directions by the operation of a swinging cylinder so that the pair of length setting rollers are shifted in a joint or separation direction. Thus, the wires can be let out and stopped swiftly and the letting-out length of each of the wires can be set freely. Further, since the wires are driven simultaneously by both wire length setting rollers, the wires can be surely sent with no slip, permitting accurate wire-length setting. For the same reason, the wires are not required to be brought into intimate contact with the rollers. Thus, the wires are prevented from being crushed or deformed. Even with a slight change in the covering shape of each of the wires and outer diameter of the wire, the wires can be let out accurately.

Figure 11A:
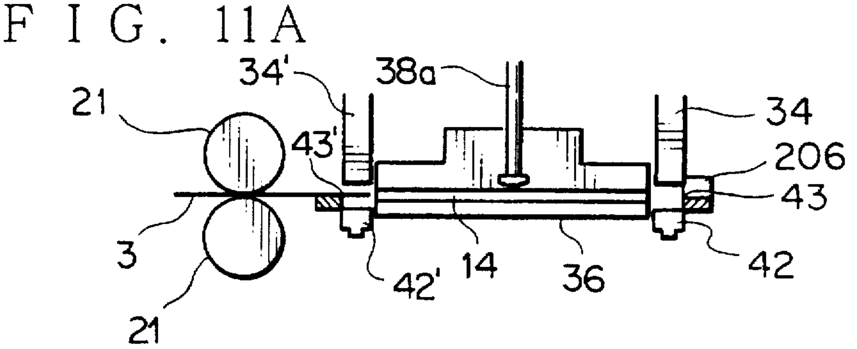
FIGS. 11A to 11E are views for explaining, in the order of operations, the concept of the wire pushing-down mechanism in a wire crimping apparatus according to the present invention.
Figure 11B:
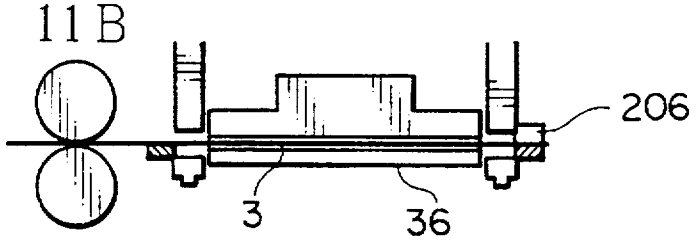
Figure 11C:
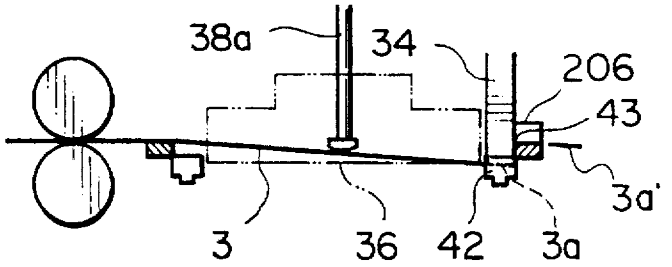

FIGS. 11A to 11E show conceptual views of the wire pushing-down section 8 shown in FIG. 1. In FIGS. 11A to 11E, like reference numerals refer to like elements in FIGS. 1 to 7. FIG. 11A shows a state where the wire 3 sent out from a pair of wire-length setting rollers 21, 21' are passed through a closable chuck guide 36 between front and rear crimping blades 34, 34'. Below the crimping blades 34, 34', crimping connectors 42, 42' are located. Outside the front crimping blade 34, a trim guide 206 is located. At the center position of the chuck guide 36 having a wire passing-through groove 14, a wire drooping rod **38*a* which is a feature of the present invention. As shown in FIG. 11B, the wire 3, which passes through the chuck guide 36, is supported by the trim guide 206**.

Figure 11D:
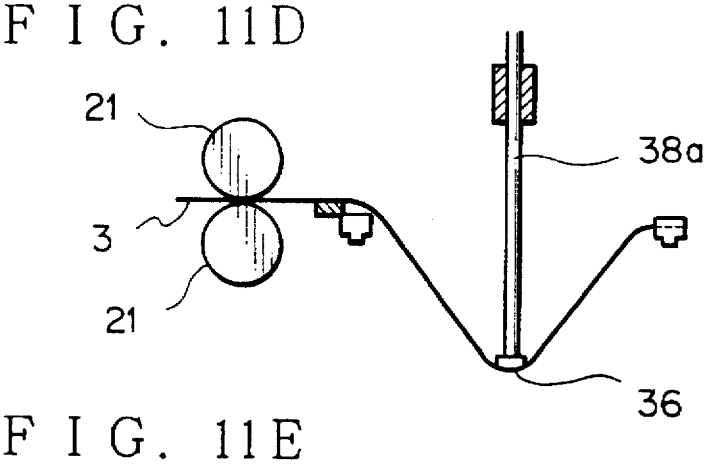
Figure 11E:
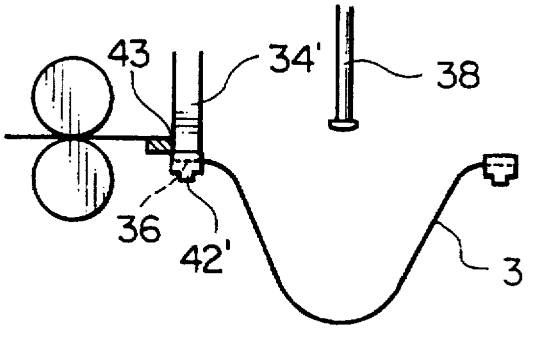

As shown in FIG. 11B, the tip **3*a* of the wire 3 is crimped to one connector 205 by the crimping blade 34 in a state where the chuck guide 204 is opened. The wire tip 3*a'* is cut by a block blade 34 for the trim guide 206 immediately before it is crimped. As shown in FIG. 11D, at the same time when the wire 3 is let out by the wire-length setting rollers 21, 21', the wire drooping rod 38*a* falls to push the central portion of the wire 3 downward so as to form a V-shape. Thus, the wire 202** is smoothly extended to a predetermined length without intertwining with an adjacent wire so that it is bent in a U-shape. Finally, as shown in FIG. 11E, with the stem of the wire 3 pressed by a rear crimping blade 34', the wire 3 is cut by a block blade 34' and also crimped to the other connector 42'. It should be noted that the wire drooping rod 38*a* falls owing to its own weight, or forcibly pushed down by e.g. an air cylinder.

The concrete structure of the wire pushing-down mechanism has been already explained in connection with FIGS. 4 to 6. In this structure, as shown by a dotted line 38' in FIG. 4, the drooping rod 38*a* may be bent in a crank shape so that it is located at the central position of wire guides 35, 35'.

Figure 12:
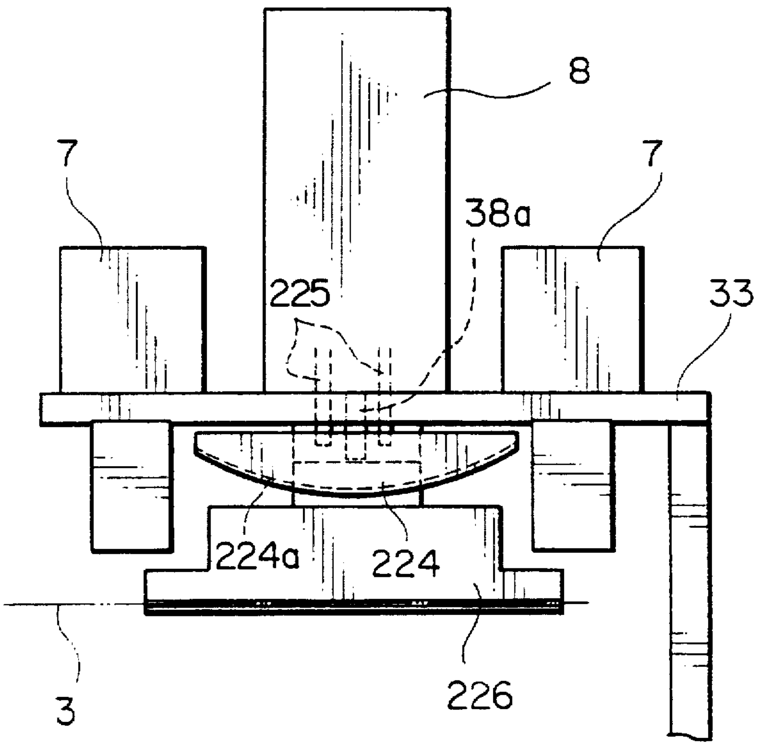
FIG. 12 is a side view of another embodiment of the wire pushing-down mechanism in the wire crimping portion.
Figure 13:
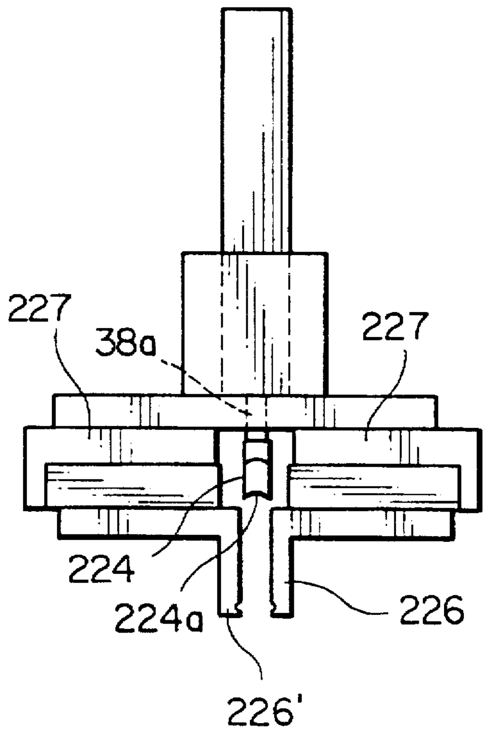
FIG. 13 is a front view of the wire pushing-down mechanism of FIG. 19.
Figure 14:
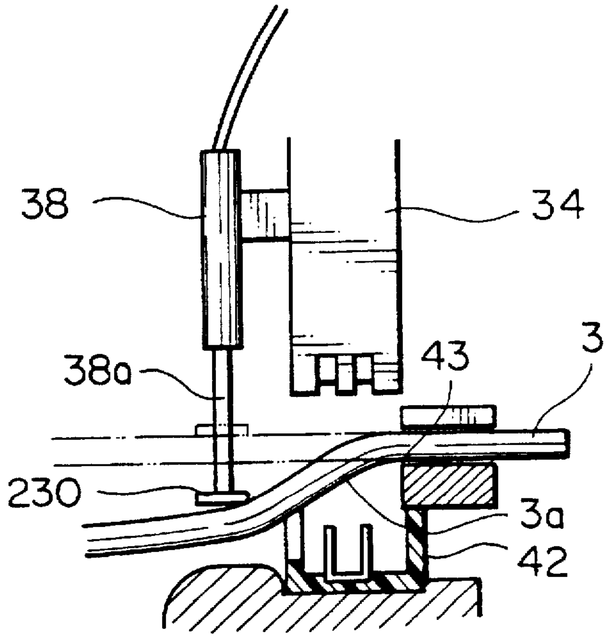
FIG. 14 is a side view of the wire pushing-down mechanism in wire crimping.
Figure 15:
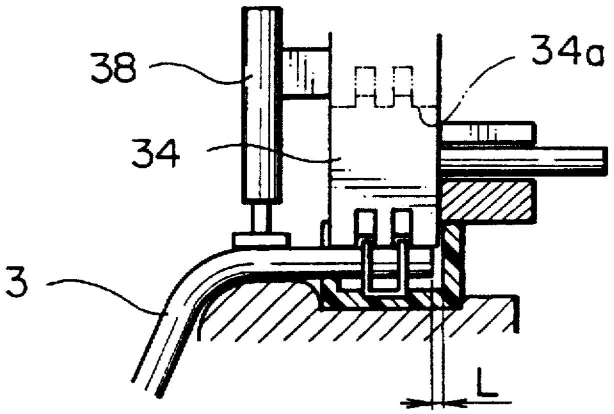
FIG. 15 is a side view of the wire pushing-down mechanism in a state where wire-crimping has been completed.

Referring to FIGS. 12 to 13, an explanation will be given of another embodiment of the wire drooping cylinder 38. The wire drooping cylinder 38 is located at an intermediate position between the pair of crimping cylinders 7, 7' on a frame base plate 33. The wire drooping rod 38*a* has a semicircular wire drooping head 224 at its tip. As shown in FIG. 13, the head 224*a* has, at its tip, an arc-shaped wire guiding groove 224*a* which permits the wire 3 to be surely caught. The wire drooping cylinder 38 has a pair of rotation-stopping guides 225, 225' on both sides of the rod 38*a*. A pair of wire guides 35, 35' located at the right and left positions of the wire drooping head 224 can be opened/closed by a pair of transverse cylinders 227, 227' located on the flame base plate 33.

The front end of the wire 3 is first crimped, and after letting-out of the wire 3, the rear end (stem) of the wire 3 is crimped. In order that the wire 3 does not retract in crimping as in the prior art, the wire crimping apparatus has a vertical air-type wire pushing-down cylinder 38 integrally attached to the inside of each of the crimping blades 34, 34'. The wire pushing-down cylinder 38 has a holding plate 38 at its tip of the rod 38*a*. As a crimping blade 34 falls, the holding plate 230 pushes down the tip 3*a* of the wire 3 cut by a block blade 43 to be pushed to the side of a connector. This prevents the wire 3 from being retracted. Thus, the wire 3 can be surely crimped to the connector with a suitable margin L in a state where the wire 3 has been pushed by the wire pushing-down cylinder 38. It is also efficient to form an antiskid "knurl" on the tip surface 34*a* of the crimping blade 34.

In accordance with the wire pushing-down mechanism according to the present invention, in letting out the wires by the wire length setting rollers, since a wire drooping rod pushes down the wires downward, the wires can be smoothly extended in a manner curved in a U-shape. As a result, adjacent wires can prevented from being intertwined, thus realizing smooth wire crimping. Further, in wire crimping, since the wires are pressed against the connector side by a wire pushing cylinder, the wires can be surely crimped to the connector with no retreat and suitable protruding margin by the crimping blade. Accordingly, reliability of the electrical connection can be improved.

Figure 17:
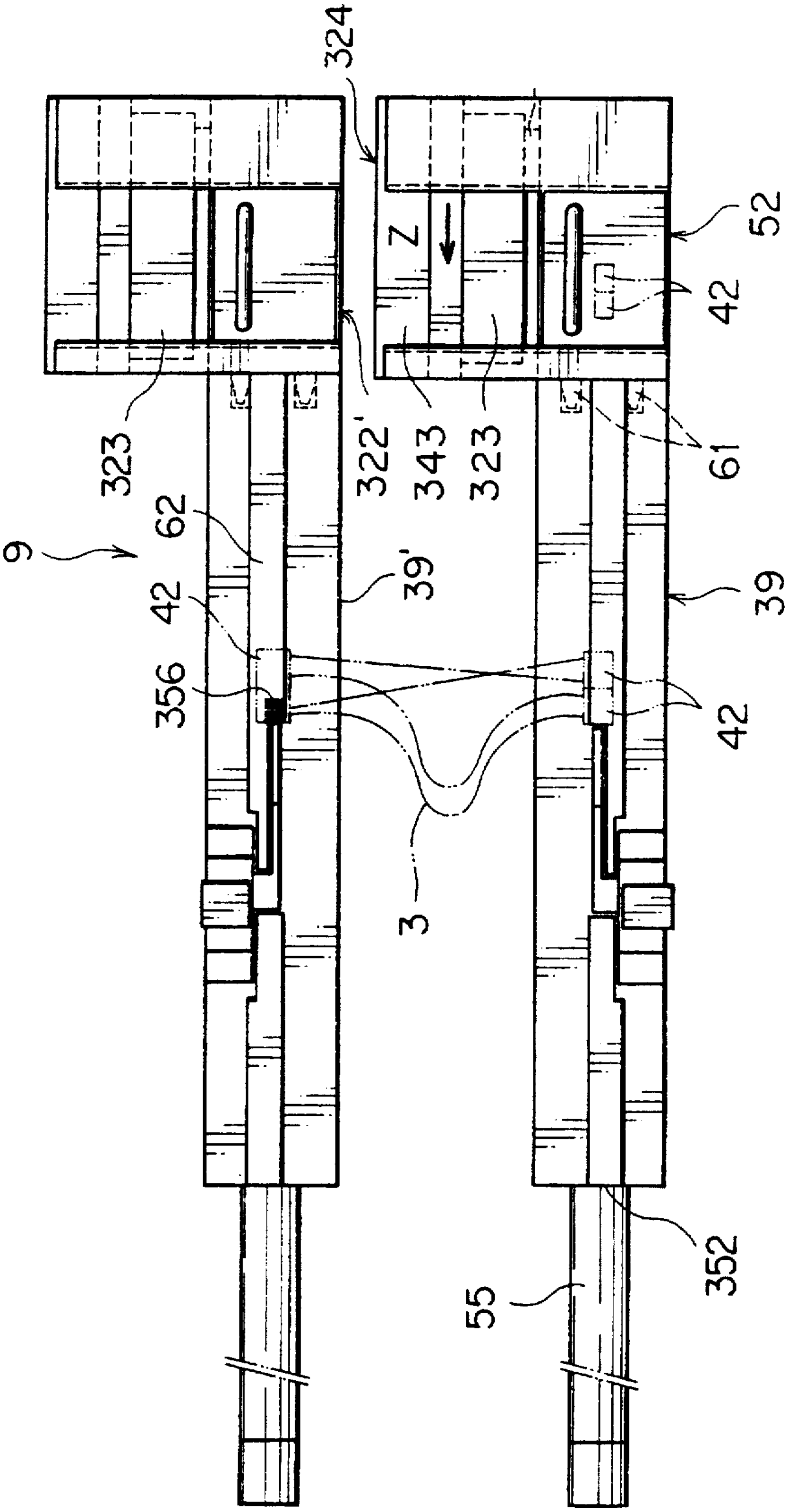
FIG. 17 is a plan view of the connector moving mechanism according to the present invention.
Figure 18:
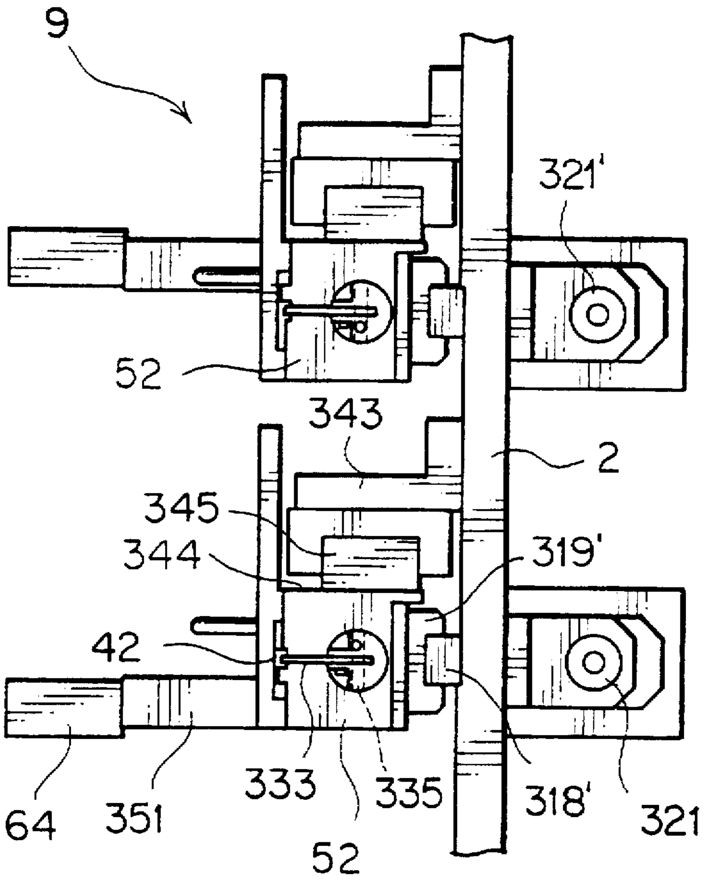
FIG. 18 is a front view of the connector moving mechanism according to the present invention.

Now referring to FIGS. 16 to 18, a detailed explanation will be given of the connector moving section 9 (9') in FIG. 1. As seen from these figures, the connector moving section 9 includes a moving table body 39 (39')with slide guides 319, 319' engaged with rails 318, 318' on a flame stand 2 of the wire crimping apparatus 1, a moving motor 51 which serves as means for driving the moving table 39 in a longitudinal direction by a screw shaft 50, a connector loading portion 52 removably coupled with the stem side of the moving table body 39, and a slide coupling portion 324 which is fixed to the flame stand 2 and slidably couples the connector loading portion 52 to the flame stand 2. The moving table bodies 39, 39' have the corresponding connector loading portions 52, 52' and slide cylinders 323, 323' which are symmetrically arranged.

Figure 16:
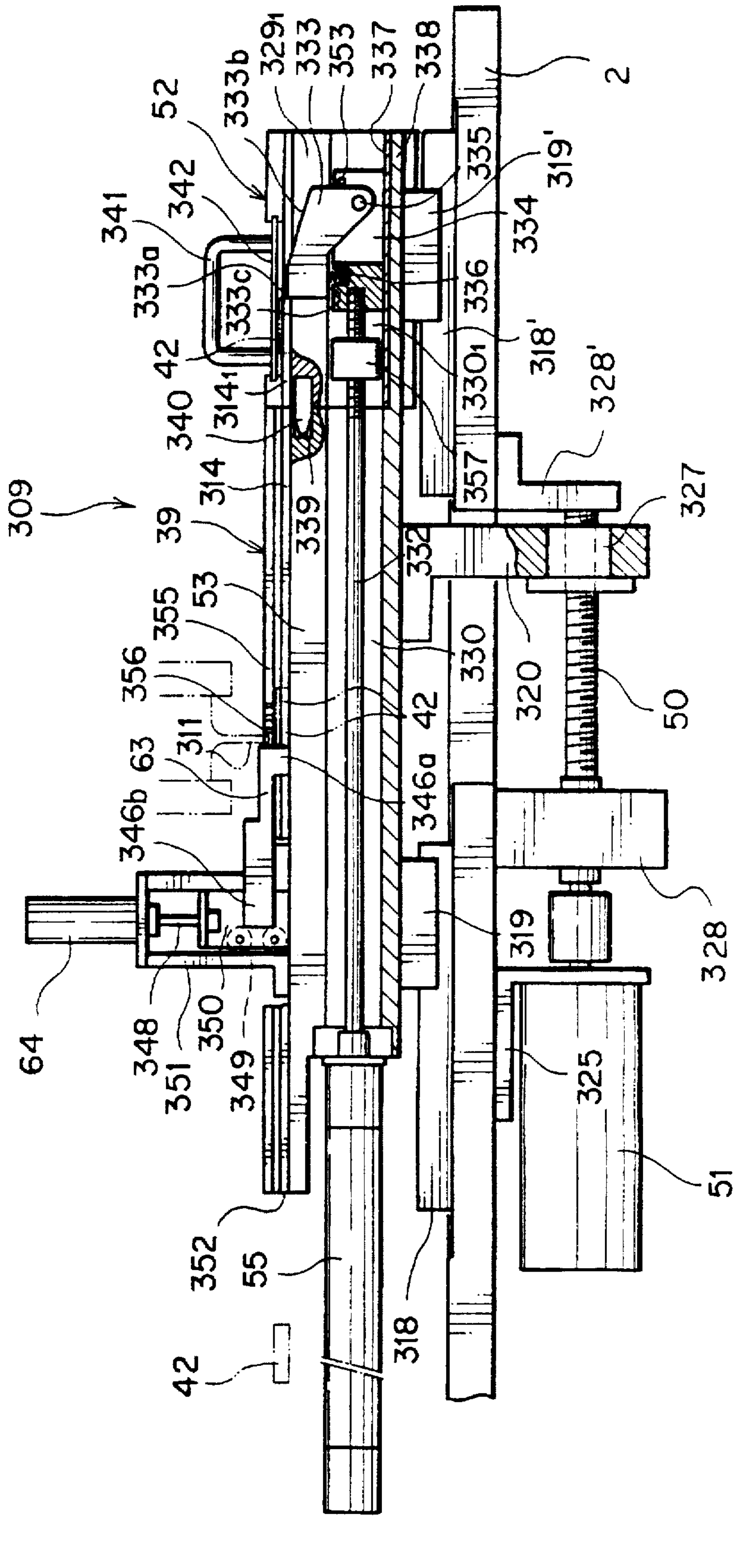
FIG. 16 is a longitudinal sectional view of the connector moving mechanism according to the present invention.

As seen from FIG. 16, the moving motor 51 which is fixed to the lower side of the flame stand 2 through a blanket 325 can shift the table body 39 in such a manner that the screw shaft 50 is screwed to the female screw shaft 327 of a protruding wall 326 on the bottom side of the table 39. The front and rear ends of the screw shaft 50 are supported by bearing portions 328, 328'.

The moving table body 39 has a longitudinal connector container groove 314 at its upper position and a longitudinal through-hole 330 which is located below the container groove 314 and communicates with it through a slit 329. A sideways-located air-type connector moving cylinder 51 serving as driving means is fixed at the rear end of the connector moving table 39. The rod 332 of the moving cylinder 55 is passed through the through-hole 330. A slide block 334 having a plate-like transport hook 333 which hooks a connector 42 to move in the container groove 314 is coupled with the tip of the rod 332 through floating joint 357. The slide block 334 can slide through the through-hole 330. Thus, the transport hook 333, which is swingably supported by the slide block 334 with the aid of a pin 335, moves in a slit 329 to push the connector 315 by its tip portion 333*a* protruding into the connector container groove 314.

The transport hook 333 the bottom portion 334 of which is forced in a direction of the connector container groove by a spring 336 resiliently provided between a tapered rear portion 333*b* and the slide block 334, and is axially supported. The tapered rear portion 333*b* serves to prevent interference with the connector 315 within the connector loading portion 52 when the slide block 334 moves back and forth, and the transporting hook 333 pushes the coil spring 336 so that it swings downwards on the pin 335. The rotation of the transport hook 333 when transporting the connector is prevented by a stopper pin provided protrusively on the tip side of the slide block 334.

Figure 19:
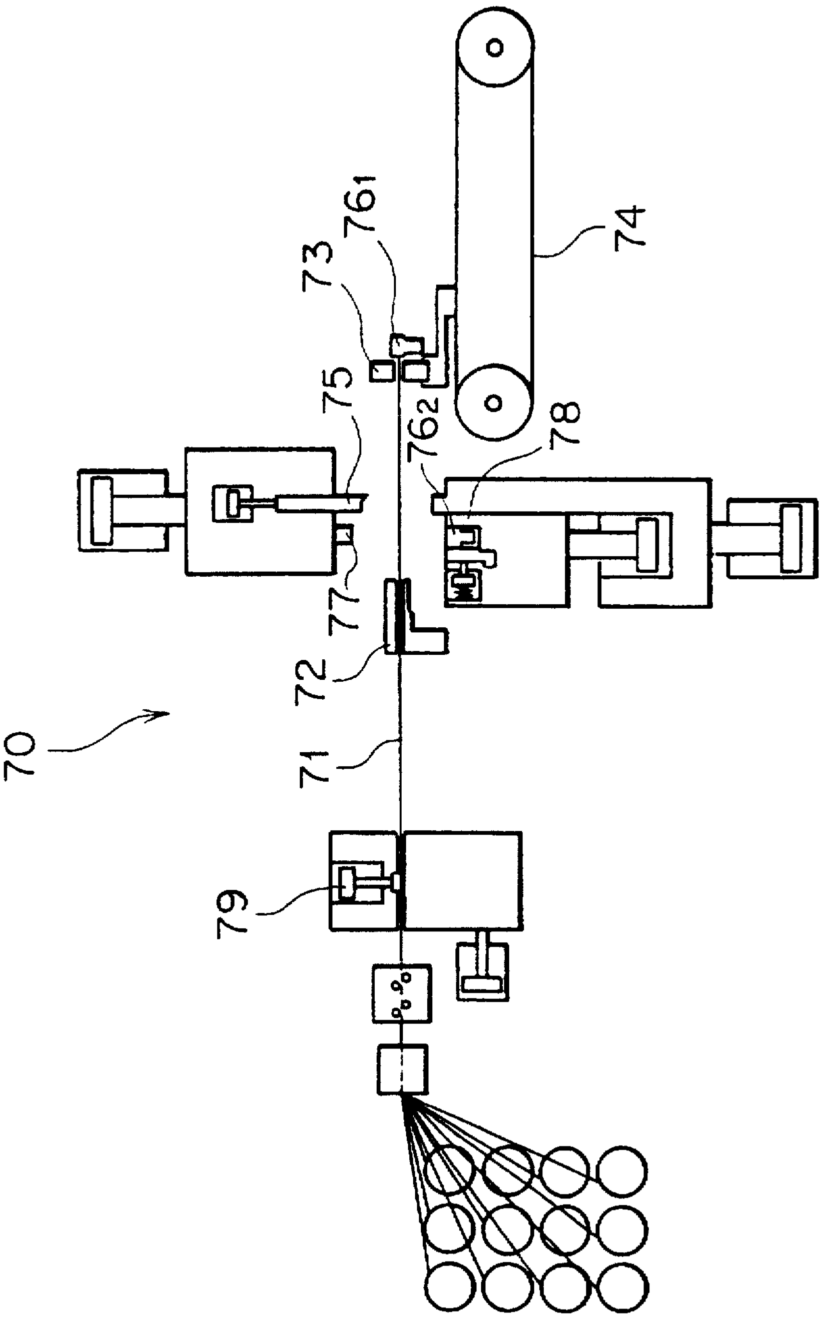
FIG. 19 PRIOR ART
FIG. 19 is a side view of the prior art wire crimping apparatus.
Figure 20:
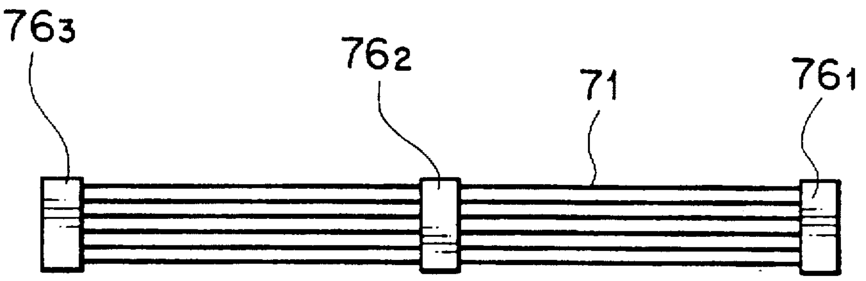
FIG. 20 PRIOR ART
FIG. 20 is a front view of one format in which wires are connected to connectors.
Figure 21:
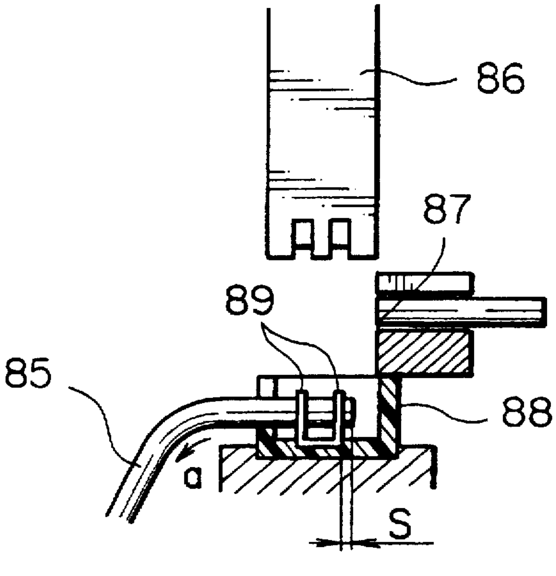
FIG. 21 PRIOR ART
FIG. 21 is a side view of another wire crimping apparatus in a wire-crimping state.

The connector loading portion 52 includes a through-hole extension portion $330_1$ which is coaxial to the through-hole 330 and a slit extension portion $329_1$ and a container groove extension portion $314_1$ which correspond to the slit 329 and connector container groove 314, respectively. The bottom wall 337 of the loading portion can be slidably engaged to the bottom wall extension portion 338 of the table body 39. On the end terminal of the connector loading portion 322, a pair of positioning pins 340 for an engagement hole 339 of the table body 39 are provided protrusively. Through the positioning pins 340, the connector loading portion 52 is coupled with the moving table 39. When the table 308 is moved by the moving motor 51, the connector loading portion 52 can be separated from the table body 308 to load the connector 42 therein. A sliding cylinder cover 62 equipped with a handle 341 is opened to load the connector 42 in the connector container groove $314_1$. Separation and coupling of the connector loading portion 52 can be performed by a slide cylinder 323 which is located between it and a fixing wall 343 of the flame stand 2 as shown in FIGS. 19 and 20.

The slide cylinder 323 is fixed to an L-shaped fixed wall 343 provided vertically on the flame stand 2. The slide cylinder 323 is slidably engaged with the guide wall 345 fixed to the side wall 344 of the connector loading portion 52 to move the connector loading portion 52 back and forth in a longitudinal direction. When the slide cylinder 323 move forth in a direction of an arrow z, the connector loading portion 52 can move together with the table body 39. When the slide cylinder 323 moves back, the connector loading portion 52 is separated from the table body 308 so that the table 39 transversely moves sorely. Thus, the connector 42 can be stably supplied to the connector loading portion 52 without being influenced by the table shift when the wire 3 is crimped. The slide coupling portion 324 is composed of the slide cylinder 323 and a fixed wall 43 and a guide wall 345.

In the intermediate portion of the table body 39, an L-shaped plate-like positioning stopper 63 is placed at the approaching position of the crimping blade 311. Between the tip 63*a* of the positioning stopper 63 and the tip of the transport hook 333, a plurality of connectors 42 are arranged in series. The stem 63*b* of the positioning stopper 63 is coupled with the rod 348 of an air-type releasing cylinder 347 which serves as a driving means placed vertically on the table body 39 through a vertical slider 350 equipped with a roller 349. The positioning stopper 63 can fall/rise integrally to the rod 348. The releasing cylinder 64 is fixed to the guide flame 351 on the table body 39 and the vertical slider 350 can rise/fall in the guide flame 351.

When the positioning stopper 63 is risen, with the aid of the contraction operation of the moving cylinder 331, the transport hook 333 sweeps away externally the wire-crimped connector 42 along the connector container groove 314 from the connector sweeping-away portion 352 on the side of the table end. A plurality of blade passing-through slits 356 for the wire crimping blade 311 corresponding to the number of wire crimpings are provided in the cover 355 of the connector container groove 314. A pair of moving table bodies 39, 39' can move independently of each other by the corresponding moving motors 51, 51', which permits the wire 3 to be connected to the connectors 42, 42' in a crossing manner as seen from FIG. 20.

In accordance with the connector moving mechanism according to the present invention, since the plural connectors can be held to the moving table body by the transport hook and positioning stopper, the connectors are not required to be mounted one by one, thus improving the productivity of a sub-wire-harness assembly. Further, since the connectors can be mounted in a state where the connector mounting portion is separated from the moving table body, good workability can be provided. Further, by separating the positioning stopper from the connector accommodating groove by the releasing cylinder, the wire-crimped connecters can be swept out along the connector accommodating groove by the transport hook. Thus, a single device can perform supply of a connector, wire crimping, and sweep-out of the connector substantially simultaneously so that the connector can be moved smoothly and quickly, permitting effective wire crimping.

We claim:

1. A wire crimping apparatus, comprising:

a movable crimping blade;

a block blade which is arranged between said crimping blade and a connector to support and cut a wire, a connector support for supporting a connector and a surface adjacent thereto; and wire-pushing down means for pushing down on the wire, said wire-pushing down means comprising a rod member supported in a cylinder for actuated extension and retraction and arranged adjacently to said crimping blade, said rod member being configured to pressingly engage the wire when the crimping blade is advanced downward towards the connector to cut the wire, said rod member clampling the wire against said surface thereby preventing the wire from being retracted.

* * * * *

UNITED STATES PATENT AND TRADEMARK OFFICE
CERTIFICATE OF CORRECTION

PATENT NO. : 5,791,037

DATED : August 11, 1998

INVENTOR(S) : Takada et al.

It is certified that error appears in the above-identified patent and that said Letters Patent is hereby corrected as shown below:

On the title page
Item [30], delete:

"Jul. 12, 1993 [JP] Japan 5-306472
Jul. 12, 1993 [JP] Japan 5-306473
Aug. 12, 1993 [JP] Japan 5-307857
Aug. 12, 1993 [JP] Japan 5-307858 "

insert therefor:

-- Dec. 7, 1993 [JP] Japan 5-306472
Dec. 7, 1993 [JP] Japan 5-306473
Dec. 8, 1993 [JP] Japan 5-307857
Dec. 8, 1993 [JP] Japan 5-307858 --

Signed and Sealed this

Eighth Day of December, 1998

*Attest:*

BRUCE LEHMAN

*Attesting Officer*

*Commissioner of Patents and Trademarks*